United States Patent
Saito

[19]
[11] Patent Number: 6,094,328
[45] Date of Patent: *Jul. 25, 2000

[54] THIN-FILM MAGNETIC HEAD WITH ANTIFERROMAGNETIC LAYER AND HARD MAGNETIC LAYERS ARRANGED TO BIAS A MAGNETORESISTIVE DEVICE

[75] Inventor: Masamichi Saito, Niigata-ken, Japan

[73] Assignee: Alps Electric Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/505,835

[22] Filed: Jul. 21, 1995

[30] Foreign Application Priority Data

Aug. 1, 1994 [JP] Japan ..................................... 6-199003

[51] Int. Cl.$^7$ ....................................................... G11B 5/39
[52] U.S. Cl. .................. 360/324.12; 360/324.11
[58] Field of Search ................... 360/113, 126, 360/324.12, 324.11

[56] References Cited

U.S. PATENT DOCUMENTS

| | | | |
|---|---|---|---|
| 4,755,897 | 7/1988 | Howard | 360/113 |
| 4,809,109 | 2/1989 | Howard | 360/113 |
| 4,825,325 | 4/1989 | Howard | 360/113 |
| 5,014,147 | 5/1991 | Parkin et al. | 360/113 |
| 5,018,037 | 5/1991 | Krounbi et al. | 360/113 |
| 5,159,513 | 10/1992 | Dieny et al. | 360/113 |
| 5,206,590 | 4/1993 | Dieny et al. | 360/113 |
| 5,301,079 | 4/1994 | Cain et al. | 360/113 |
| 5,304,975 | 4/1994 | Saito et al. | 360/113 |
| 5,442,507 | 8/1995 | Koga et al. | 360/113 |
| 5,508,866 | 4/1996 | Gill et al. | 360/113 |
| 5,905,611 | 5/1999 | Yoda et al. | 360/113 |
| 5,966,272 | 10/1999 | Cain | 360/113 |

FOREIGN PATENT DOCUMENTS 0631276  12/1994  European Pat. Off. .

*Primary Examiner*—Craig A. Renner
*Attorney, Agent, or Firm*—Brinks Hofer Gilson & Lione

[57] ABSTRACT

A thin-film magnetic head of the present invention has a magnetoresistive device composed of a first magnetic layer, a non-magnetic layer and a second magnetic layer. An antiferromagnetic layer is in close contact with the first magnetic layer, and hard magnetic layers are formed on both sides of the second magnetic layer. The magnetization direction of the first magnetic layer is fixed in the y direction by exchange anisotropic coupling to the antiferromagnetic layer, and the second magnetic layer is put into a single domain state in the x direction by the application of magnetic anisotropy from a recording medium. Accordingly, the angle between the magnetization directions of the first and second magnetic layers changes continuously in response to the change in a leakage magnetic field in the y direction from the recording medium, the electric resistance of the magnetoresistive device changes continuously, and therefore, Barkhausen noise is minimized.

20 Claims, 2 Drawing Sheets

THIN-FILM MAGNETIC HEAD WITH ANTIFERROMAGNETIC LAYER AND HARD MAGNETIC LAYERS ARRANGED TO BIAS A MAGNETORESISTIVE DEVICE

BACKGROUND OF THE INVENTION

1. Field of the Invention

The present invention relates to a thin-film magnetic head to be mounted in a magnetic recording and reproducing apparatus and the like, and more particularly, to a thin-film magnetic head having a magnetoresistive device composed of a laminate of a magnetic layer, a non-magnetic conductive layer and a magnetic layer to detect changes in a leakage magnetic field from a recording medium in what is called the spin valve method.

2. Description of the Related Art

Thin-film magnetic heads of what is called the spin valve type have been provided to magnetically reproduce signals recorded on a recording medium at high density, and one example of such magnetic heads is disclosed in, for example, U.S. Pat. No. 5,159,513.

The spin valve thin-film magnetic head comprises a magnetoresistive device 4 having a sandwich structure composed of a first magnetic layer 1, a non-magnetic conductive layer 2 and a second magnetic layer 3 as shown in FIG. 2. An antiferromagnetic layer 5 is further provided on the first magnetic layer 1, and exchange anisotropic coupling between the first magnetic layer 1 and the antiferromagnetic layer 5 fixes the magnetization direction of the magnetic layer 1 in one direction. When a leakage magnetic field is applied from a recording medium on which magnetic signals are recorded, the magnetization direction is changed in the second magnetic layer 3, and the electric resistance varies according to the angle formed between the magnetization directions of the first magnetic layer 1 and the second magnetic layer 3. The electric resistance is lowest when the magnetization directions of the magnetic layers 1 and 3 are parallel, and is highest when the magnetization directions are antiparallel.

FIG. 3 shows the relationship between the leakage magnetic field M applied to the magnetoresistive device 4 and the electric resistance R. When a stationary current is applied to the magnetoresistive device 4, detection voltage changes in response to changes δ in the electric resistance. The change in the leakage magnetic field from the recording medium is detected based on the detection voltage, and the magnetic signals are reproduced as electric signals.

In order to obtain a reproduction output voltage changing smoothly in response to the change in the leakage magnetic field from the recording medium in the aforesaid thin-film magnetic head, the angle between the magnetization directions of the first and second magnetic layers 1 and 3 is required to change smoothly in response to the change in the leakage magnetic field from the recording medium.

However, if the second magnetic layer 3 has a multi-domain structure, the domain structure is changed owing to the change in the leakage magnetic field from the recording medium. Rapid movement of domain walls when the domain structure changes makes the magnetization angle, which changes in response to the changes in the leakage magnetic field, discontinuously jump. Therefore, the angle between the magnetization directions of the first and second magnetic layers 1 and 3 does not change continuously in response to the change in the leakage magnetic field from the recording medium, and discontinuous or irregular jumps of the magnetization rotation angle occur. This causes discontinuous or irregular jumps in the voltage of the stationary current, that is, the reproduction voltage, which result in Barkhausen noises n shown in FIG. 3.

SUMMARY OF THE INVENTION

The present invention aims to solve the aforesaid problem of the prior art, and it is an object of the present invention to provide a thin-film magnetic head which allows smooth changes in the angle between magnetization directions of magnetic layers in response to changes in a leakage magnetic field from a recording medium and obtains a continuous reproduction output with little noise.

In order to achieve the above object, there is provided a thin-film magnetic head comprising a magnetoresistive device composed of a first magnetic layer, a non-magnetic layer and a second magnetic layer, an antiferromagnetic layer for fixing the magnetization direction of the first magnetic layer in one direction by exchange anisotropic coupling, and hard magnetic layers located on both sides of the second magnetic layer to apply a magnetic field in a direction perpendicular to the fixed magnetization direction to the second magnetic layer by magnetostatic coupling, wherein the magnetization direction is changed (rotated) in the second magnetic layer by a leakage magnetic field from a recording medium.

The fixed magnetization direction of the first magnetic layer is a direction normal to the recording medium, and the direction of the magnetic field applied to the second magnetic layer is parallel with the recording medium.

The first magnetic layer functions as a ferromagnetic layer, and the second magnetic layer functions as a soft magnetic layer.

The hard magnetic layers are made of, for example, any of Co—Cr, Co—Cr—Ta, Co—Pt, Co—Cr—Pt and Co—Cr—Ni alloys.

In the aforesaid means, the magnetization direction of the first magnetic layer is, for example, the direction normal to the recording medium, and is fixed by exchange anisotropic coupling caused at an interface between the first magnetic layer and the antiferromagnetic layer in close contact with each other. This exchange anisotropic coupling puts the first magnetic layer into a single domain state in the aforesaid direction. In order to fix the magnetization direction of the first magnetic layer in one direction, the antiferromagnetic layer is treated with heat while a magnetic field is being applied at a temperature higher than the Neel temperature after the first magnetic layer and the antiferromagnetic layer are laminated in close contact, or a magnetic field is applied when the antiferromagnetic layer is formed.

Since the fixed magnetization direction of the first magnetic layer is the direction normal to the recording medium, it is not changed by the action of the leakage magnetic field from the recording medium. Furthermore, an exchange anisotropic coupling magnetic field between the antiferromagnetic layer and the first magnetic layer is required to be set sufficiently larger than the leakage magnetic field from the recording medium.

Magnetostatic coupling between the second magnetic layer and the hard magnetic layers located on both sides thereof applies magnetic anisotropy to the second magnetic layer and puts the second magnetic layer into a single domain state. The intensity of the magnetic anisotropy applied to the second magnetic layer is proportional to the intensity of residual magnetism or the thickness of the hard magnetic layers, and can be arbitrarily set by the appropriate choice of the material and thickness of the hard magnetic material. The single domain state of the first magnetic field is set according to the change in the leakage magnetic field from the recording medium to a degree which allows smooth rotation of the magnetization direction in the first magnetic layer.

The magnetization direction of the first magnetic layer is fixed in the direction normal to the recording medium by exchange anisotropic coupling between the first magnetic layer and the antiferromagnetic layer, and the second magnetic layer is put into a single domain state in a direction parallel to the recording medium and vertical to the fixed magnetization direction of the first magnetic layer by magnetostatic coupling to the hard magnetic layer. When a leakage magnetic field is applied from the recording medium in this state, the magnetization direction changes in the second magnetic layer in response to the change in the leakage magnetic field, and the angle between the magnetization directions of the first and second magnetic layers changes continuously and smoothly as the leakage magnetic field changes. Accordingly, the magnetic resistance of the magnetoresistive device changes continuously and smoothly in accordance with the leakage magnetic field from the recording medium, thereby reducing Barkhausen noise in the reproduction output voltage.

In this thin-film magnetic head, the change rate of the resistance of the magnetoresistive device can be increased by a weak leakage magnetic field from the recording medium. Furthermore, since the change in the electric resistance of the magnetoresistive device relative to the change in leakage magnetic field is continuous as mentioned above, magnetic signals recorded on a high-density recording medium can be reproduced with high sensitivity and with little noise.

DESCRIPTION OF THE PREFERRED EMBODIMENT

The preferred embodiment of the present invention will now be described below.

Figure 1:
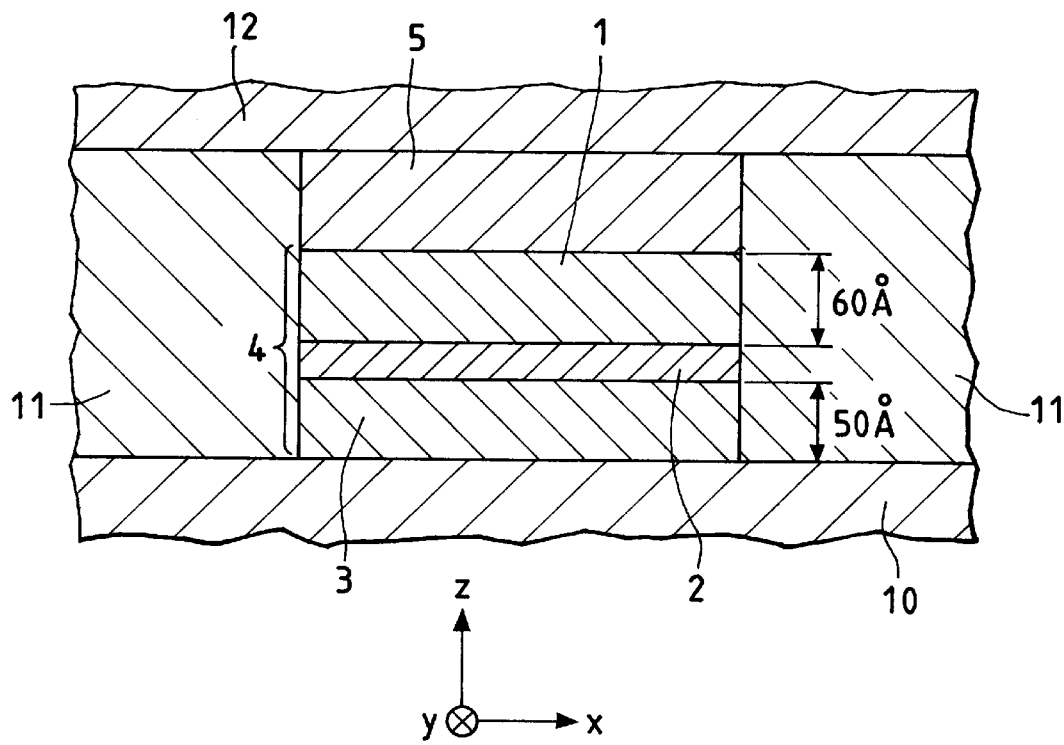
FIG. 1 is an enlarged front view (cross sectional view) showing an embodiment of a thin-film magnetic head according to the present invention.
Figure 2:
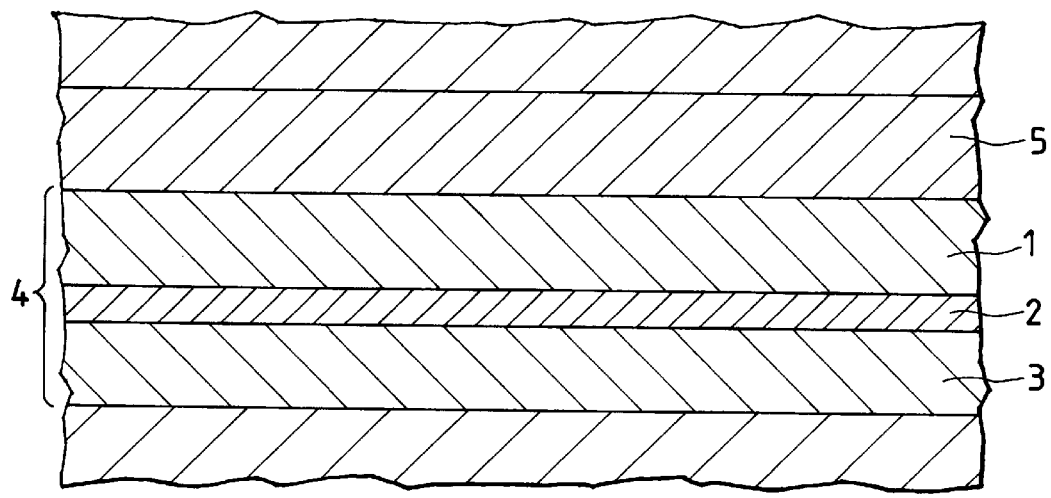
FIG. 2 is an enlarged front view (cross sectional view) of a conventional thin-film magnetic head.
Figure 3:
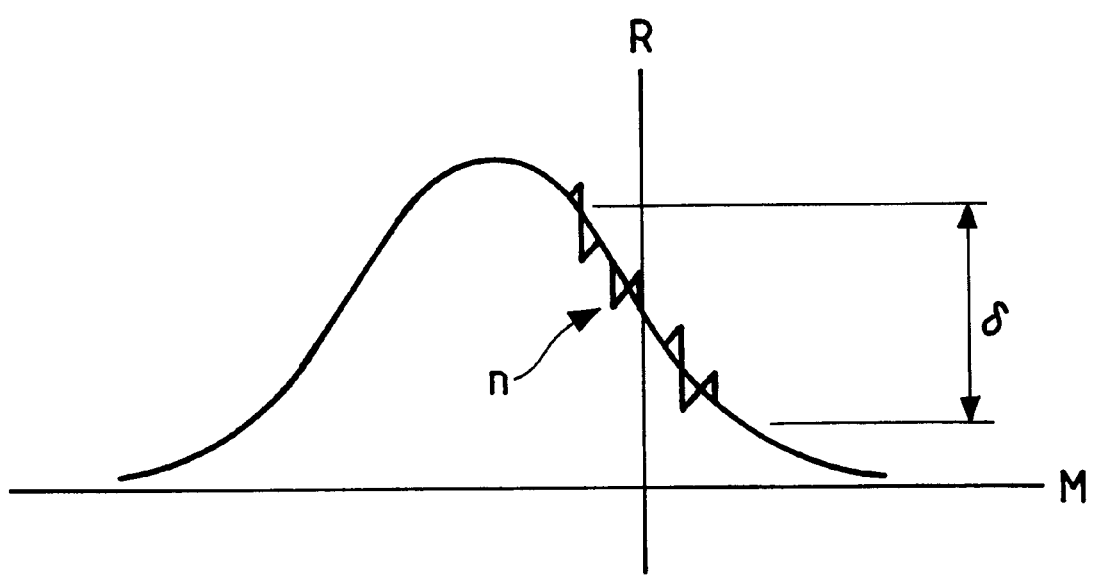
FIG. 3 is a graph showing a M–R change curve.

FIG. 1 is an enlarged front view (cross sectional view) showing a thin-film magnetic head of the present invention as viewed from the side facing a recording medium.

This thin-film magnetic head is provided on the trailing side end of a levitated magnetic head used in a hard disk apparatus, and serves as a reproduction head. If the thin-film magnetic head is used as a recording and reproducing head, a recording magnetic head portion is formed in the form of a thin film on the thin-film magnetic head shown in FIG. 1. A recording surface of a recording medium, such as a hard disk, is opposed to the magnetic head in parallel with the sheet of FIG. 1. The x direction corresponds to the track width (longitudinal) direction, the y direction corresponds to the (transverse) direction of a leakage magnetic field from the recording medium, and the z direction corresponds to the movement direction of the recording medium relative to the magnetic head.

In the thin-film magnetic head, a magnetoresistive device 4 having a sandwich structure, which is formed by laminating a first magnetic layer (ferromagnetic layer) 1, a non-magnetic conductive layer 2 and a second magnetic layer (soft magnetic layer) 3, is laid on a substrate layer 10. An antiferromagnetic layer 5 is laid on the first magnetic layer (ferromagnetic layer) 1 in close contact therewith. Furthermore, hard magnetic layers 11 and 11 are formed on both sides of the second magnetic layer (soft magnetic layer) 3, that is, on both sides of the magnetoresistive device 4, and an upper layer 12 is formed over the antiferromagnetic layer 5 and the hard magnetic layers 11 and 11.

The first magnetic layer 1 is a film made of a $Ni_{80}Fe_{20}$ (atm %) alloy and having a thickness of 60 Å, and the antiferromagnetic layer 5 is a film made of a $Fe_{50}Mn_{50}$ (atm %) alloy and having a thickness of 300 Å. An exchange anisotropic coupling magnetic field of 200 Oe to 300 Oe can be formed by treating a laminate composed of the first magnetic layer 1 and the antiferromagnetic layer 5 with heat in a magnetic field at a temperature of 250° C. This exchange anisotropic coupling fixes the magnetization direction of the first magnetic layer 1 in the y direction. The exchange anisotropic magnetic field in a range of 200 Oe to 300 Oe is sufficiently larger than the leakage magnetic field in the y direction from the recording medium.

The second magnetic layer (soft magnetic layer) 3 is a film made of a $Ni_{80}Fe_{20}$ (atm %) alloy and having a thickness of 50 Å or 40 Å, and the hard magnetic layers 11 are films each made of a $Co_{84}Cr_{12}Ta_{4}$ alloy and having a thickness of 200 Å. The hard magnetic layers 11 have a high coercivity and a high retentivity, and apply the x-direction magnetic anisotropy to the second magnetic layer (soft magnetic layer) 3. The intensity of the magnetically anisotropic magnetic field of the second magnetic layer 3 is approximately 10 Oe, and the second magnetic layer 3 is easily put into a single domain state in the x direction.

The non-magnetic conductive layer 2 is a Cu film of 20 Å in thickness.

When the recording medium moves in the z direction relative to the thin-film magnetic head and a weak leakage magnetic field of approximately 10 Oe to 20 Oe is applied from the recording medium to the magnetic head, the magnetization direction is changed in the second magnetic layer 3 (in the x–y plane) in response to the change in the leakage magnetic field. The electric resistance of the magnetoresistive device 4 varies according to the angle difference between the fixed y direction in the first magnetic layer 1 and the magnetization direction of the second magnetic layer 3 which is put in a single domain state in the x direction. A stationary current flows from an unillustrated lead layer to the magnetoresistive device 4 through the hard magnetic layers 11. The voltage of the stationary current changes owing to the change in resistance of the magnetoresistive device 4 corresponding to the change in the leakage magnetic field from the recording medium, by which magnetic signals recorded on the recording medium are reproduced.

In the thin-film magnetic head having the above-mentioned structure, the resistance change rate of the magnetoresistive device 4 can be set at approximately 5% by a weak leakage magnetic field of approximately 10 Oe to 20 Oe from the recording medium.

In this thin-film magnetic head, the magnetization direction of the first magnetic layer (ferromagnetic layer) 1 is fixed in the y direction by a strong exchange coupling magnetic field of approximately 200 Oe to 300 Oe in exchange anisotropic coupling between the first magnetic layer 1 and the antiferromagnetic layer 5, and a magnetically anisotropic magnetic field of approximately 10 Oe is applied from the hard magnetic layers 11 to the second magnetic layer (soft magnetic layer) 3, by which the second magnetic layer 3 is put into a single domain state in the x direction. Therefore, the angle between the magnetization directions of the first and second magnetic layers 1 and 3 changes smoothly and continuously corresponding to the change in the leakage magnetic field from the recording medium, no discontinuous or irregular jump appears in the detected reproduction voltage, and Barkhausen noise can be reduced.

Furthermore, in the thin-film magnetic head shown in FIG. 1, since the hard magnetic layers 11 and 11 are continuously formed on both sides of the four-layer portion in which the antiferromagnetic layer 5 is laid on the trilayer magnetoresistive device 4, the number of films to be laminated is small, and the structure is simple. Still further, since the right and left portions of the four layers, composed of the magnetoresistive device 4 and the antiferromagnetic layer 5, are removed by etching and the hard magnetic layers 11 are formed therein, the film deposition process is also simple.

The hard magnetic layers 11 may be made of any of Co—Cr, Co—Pt, Co—Cr—Pt and Co—Cr—Ni alloys instead of the Co—Cr—Ta alloy.

As described above, according to the present invention, the magnetization direction of the first magnetic layer in the magnetoresistive device is fixed in a specific direction by exchange anisotropic coupling, and the second magnetic layer is put in a single domain state in a direction perpendicular to the aforesaid specific direction by magnetic anisotropy applied from the hard magnetic layers magnetostatically coupled thereto. Therefore, the angle between the magnetization directions of the first and second magnetic layers changes continuously and smoothly in relation to the change in the leakage magnetic field from the recording medium, and it is thereby possible to reduce Barkhausen noise and to obtain a high-sensitivity and high-precision reproduction output.

What is claimed is:

1. A thin-film spin valve magnetic head, comprising:
an antiferromagnetic layer;
a first magnetic layer having left and right sides;
a second magnetic layer having left and right sides;
a non-magnetic layer having left and right sides; and
left and right hard magnetic portions;
wherein the non-magnetic layer is between the first magnetic layer and the second magnetic layer, the first magnetic layer is between the antiferromagnetic layer and the non-magnetic layer, and the left and right hard magnetic portions are adjacent the left and right sides, respectively, of the second magnetic layer, the non-magnetic layer and the first magnetic layer such that the hard magnetic portions extend to a level which at least includes a thickness of the second magnetic layer, the non-magnetic layer and the first magnetic layer.

2. The thin-film spin valve magnetic head of claim 1 wherein the antiferromagnetic layer contacts the first magnetic layer.

3. The thin-film spin valve magnetic head of claim 1 wherein the first magnetic layer and the second magnetic layer contact the non-magnetic layer.

4. The thin-film spin valve magnetic head of claim 1 wherein the left and right hard magnetic portions contact the left and right sides, respectively, of the second magnetic layer and the non-magnetic layer.

5. The thin-film spin valve magnetic head of claim 1 wherein the non-magnetic layer comprises a conductive material.

6. The thin-film spin valve magnetic head of claim 1 wherein the first magnetic layer has left and right sides, and the left and right hard magnetic portions are adjacent the left and right sides, respectively, of the first magnetic layer, the second magnetic layer and the non-magnetic layer.

7. A thin-film spin valve magnetic head, comprising:
a substrate;
a magnetoresistive device including a non-magnetic layer formed between a first magnetic layer and a second magnetic layer on the substrate, wherein the second magnetic layer is formed on the substrate and includes an upper surface, bottom surface and left and right side edges extending from the bottom surface on the substrate to the upper surface, wherein the magnetoresistive device defines a longitudinal direction extending between the left and right side edges and a transverse direction which is perpendicular to the longitudinal direction, both the longitudinal direction and the transverse direction being parallel to the upper surface of the second magnetic layer, and wherein the non-magnetic layer is formed on the upper surface of the second magnetic layer;
an antiferromagnetic layer in direct contact with the first magnetic layer for fixing a magnetic field having a magnetization direction of the first magnetic layer in the transverse direction by exchange anisotropic coupling magnetic field between said antiferromagnetic layer and the first magnetic layer; and
left and right hard magnetic portions respectively disposed adjacent the left and right side edges of said second magnetic layer, said non-magnetic layer and said first magnetic layer such that said hard magnetic portions extend to a level at least up to an upper surface of said first magnetic layer and extend outwardly of said left and right side edges for applying an anisotropic magnetic field to said second magnetic layer in the longitudinal direction, the anisotropic magnetic field applied by the hard magnetic portions being smaller than the exchange anisotropic coupling magnetic field between the first magnetic layer and the antiferromagnetic layer, and wherein the first magnetic layer and the non-magnetic layer have left and right side edges which are aligned with the left and right side edges of the second magnetic layer.

8. The thin-film magnetic head according to claim 7, wherein the left and right hard magnetic portions, respectively, contact the left and right side edges of the first magnetic layer and the non-magnetic layer.

9. The thin-film magnetic head according to claim 7, wherein said left and right hard magnetic portions are made of at least one alloy selected from the group consisting of Co—Cr, Co—Cr—Ta, Co—Pt, Co—Cr—Pt and Co—Cr—Ni.

10. The thin-film magnetic head according to claim 7, wherein the magnetization direction of the first magnetic layer in the transverse direction is fixed by an exchange coupling magnetic field of 200 Oe to 300 Oe, and wherein an intensity of a magnetically anisotropic magnetic field applied by the left and right hard magnetic portions to the second magnetic layer is approximately 10 Oe.

11. The thin-film magnetic head according to claim 7, wherein the first magnetic layer is formed from soft magnetic material and the second magnetic layer is formed from ferromagnetic material.

12. The thin-film magnetic head according to claim 4, wherein the first magnetic layer and the second magnetic layer are formed from a common ferromagnetic material.

13. The thin-film magnetic head according to claim 12, wherein the common ferromagnetic material is $Ni_{80}Fe_{20}$.

14. A thin-film spin valve magnetic head, comprising:

a magnetoresistive device including a first magnetic layer, a non-magnetic layer and a second magnetic layer, the non-magnetic layer being formed between the first magnetic and second magnetic layers, the second magnetic layer having an upper surface, bottom surface and left and right side edges;

an antiferromagnetic layer in direct contact with the first magnetic layer for fixing a magnetic field having a magnetization direction of said first magnetic layer in a transverse direction by exchange anisotropic coupling magnetic field between said antiferromagnetic layer and the first magnetic layer; and left and right hard magnetic portions respectively disposed adjacent the left and right side edges of said second magnetic layer, said non-magnetic layer and said first magnetic layer such that said hard magnetic portions extend to a level which at least includes a thickness of said second magnetic layer, said non-magnetic layer and said first magnetic layer, and extend outwardly of said left and right side edges, for applying an anisotropic magnetic field to said second magnetic layer in a longitudinal direction, the anisotropic magnetic field applied by the hard magnetic portions being smaller than the exchange anisotropic coupling magnetic field between the antiferromagnetic layer and the first magnetic layer;

wherein the longitudinal direction extends between the left and right side edges of the second magnetic layer, and the transverse direction is perpendicular to the longitudinal direction, and wherein the first magnetic layer and the non-magnetic layer have left and right side edges which are aligned with the left and right side edges of the second magnetic layer.

15. The thin-film magnetic head according to claim 14, wherein the left and right hard magnetic portions, respectively, contact the left and right side edges of the first magnetic layer and the non-magnetic layer.

16. The thin-film magnetic head according to claim 14, wherein said left and right magnetic portions are made of at least one alloy selected from the group consisting of Co—Cr, Co—Cr—Ta, Co—Pt, Co—Cr—Pt and Co—Cr—Ni.

17. The thin-film magnetic head according to claim 14, wherein the magnetization direction of the first magnetic layer in the transverse direction is fixed by an exchange coupling magnetic field of 200 Oe to 300 Oe, and wherein an intensity of a magnetically anisotropic magnetic field applied by the left and right hard magnetic portions to the second magnetic layer is approximately 10 Oe.

18. The thin-film magnetic head according to claim 14, wherein the first magnetic layer is formed from magnetic material and the second magnetic layer is formed from ferromagnetic material.

19. The thin-film magnetic head according to claim 14, wherin the first magnetic layer and the second magnetic layer are formed from a common ferromagnetic material.

20. The thin-film magnetic head according to claim 19, wherein the common ferromagnetic material is $Ni_{80}Fe_{20}$.

* * * * *

UNITED STATES PATENT AND TRADEMARK OFFICE
CERTIFICATE OF CORRECTION

PATENT NO. : 6,094,328
DATED : July 25, 2000
INVENTOR(S) : Masamichi Saito

It is certified that error appears in the above-identified patent and that said Letters Patent is hereby corrected as shown below:

Claim 12,
Line 1, change "claim 4," to -- claim 7, --.

Signed and Sealed this

Sixth Day of November, 2001

*Attest:*

NICHOLAS P. GODICI
*Attesting Officer*     *Acting Director of the United States Patent and Trademark Office*